US007597740B2

(12) United States Patent
Van Camp et al.

(10) Patent No.: US 7,597,740 B2
(45) Date of Patent: Oct. 6, 2009

(54) RECOVERY OF NON-FERROUS METALS FROM ZINC RESIDUES

(75) Inventors: Maurits Van Camp, Mortsel (BE); Jonathan Aerts, Turnhout (BE); Benedict Janssens, Herentals (BE)

(73) Assignee: Umicore, Brussels (BE)

( * ) Notice: Subject to any disclaimer, the term of this patent is extended or adjusted under 35 U.S.C. 154(b) by 310 days.

(21) Appl. No.: 10/562,347

(22) PCT Filed: Jun. 8, 2004

(86) PCT No.: PCT/EP2004/006238

§ 371 (c)(1),
(2), (4) Date: Jun. 20, 2006

(87) PCT Pub. No.: WO2005/005674

PCT Pub. Date: Jan. 20, 2005

(65) Prior Publication Data

US 2007/0125197 A1    Jun. 7, 2007

Related U.S. Application Data

(60) Provisional application No. 60/484,648, filed on Jul. 7, 2003.

(30) Foreign Application Priority Data

Jul. 4, 2003    (EP) ................................. 03077120

(51) Int. Cl.
*C22B 7/04*    (2006.01)
*C22B 19/30*    (2006.01)
*C22B 13/00*    (2006.01)
(52) U.S. Cl. ........................... 75/483; 75/658; 75/659; 65/19
(58) Field of Classification Search ................... 75/483, 75/658, 659; 65/19
See application file for complete search history.

(56) References Cited

U.S. PATENT DOCUMENTS

| | | | |
|---|---|---|---|
| 2,836,487 A * | 5/1958 | Fastje et al. ................... 75/468 |
| 2,932,566 A | 4/1960 | Lumsden | |
| 3,721,547 A * | 3/1973 | Dvorak et al. ................. 75/579 |
| 3,756,804 A * | 9/1973 | Stevenson ..................... 75/483 |
| 3,830,639 A * | 8/1974 | Evans et al. ..................... 65/19 |
| 4,072,503 A | 2/1978 | Peterson et al. | |
| 4,248,624 A * | 2/1981 | Novoa et al. ................... 75/472 |
| 4,415,356 A | 11/1983 | Victorovich et al. | |
| 4,415,540 A | 11/1983 | Wilkomirsky et al. | |
| 4,519,836 A | 5/1985 | Sychev et al. | |
| 4,521,245 A | 6/1985 | Yarygin et al. | |
| 4,571,260 A | 2/1986 | Johansson et al. | |
| 5,199,974 A | 4/1993 | Fugleberg | |
| 5,256,186 A | 10/1993 | Player et al. | |
| 5,282,881 A * | 2/1994 | Baldock et al. ............... 75/500 |
| 5,922,261 A * | 7/1999 | Ford, Jr. ....................... 264/122 |
| 5,942,023 A | 8/1999 | Bitler et al. | |
| 6,379,421 B1 | 4/2002 | Salinas-Fernandez et al. | |
| 2007/0095169 A1 | 5/2007 | Van Camp et al. | |

FOREIGN PATENT DOCUMENTS

| | | |
|---|---|---|
| GB | 2 094 772 | 9/1982 |
| SU | 1048810 | 7/1989 |
| WO | WO 98/36102 | 8/1998 |

OTHER PUBLICATIONS

Esna-Ashari, M. et al., "Smelting Reactor for Recovering Zinc from Industrial Low Zinc Bearing Residues" Erzmetall, Reiderer Verlag GmbH, Stuttgart, Germany, 2000, pp. 373-384, vol. 53, No. 6.
DeSchepper, A., "Liquid-liquid extraction of germanium by LIX 63", Chloride Hydrometall, Int. Symp., Proc., Brussels, Belgium, Sep. 26-28, 1977, pp. 357-384. (XP002260042 Database Accession No. EIX78110005759).
Heard, R. et al., "Recycling of Zinc-Bearing Residues with the PRIMUS Process", Iron Steelmaker I and SM, Apr. 2003, pp. 55-60, vol. 30, No. 4. (XP009020220).
Office Action, dated Feb. 2, 2009, issued in co-pending, commonly assigned U.S. Appl. No. 10/573,681.
XP-002310971 "Extn. of Valuable Components for Metallurgical Slags—by Treatment of Slag Stream with Hot Neutral or Reducing Gas Heated in Arc Plasmatron," Derwent Publication Ltd., Section Ch, Week 198223, Aug. 15, 1981.
Jak et al., "Phase Equilibria and Thermodynamics of Zinc Fuming Slags," Canadian Metallurgical Quarterly, vol. 41, No. 2, (2002), pp. 163-174.
International Search Report and Written Opinion, issued in corresponding International Application No. PCT/EP2004/006238, dated Sep. 23, 2004.
International Preliminary Report on Patentability, issued in corresponding International Application No. PCT/EP2004/006238, dated Oct. 7, 2005.

(Continued)

*Primary Examiner*—George Wyszomierski
*Assistant Examiner*—Tima M McGuthry-Banks
(74) *Attorney, Agent, or Firm*—Brinks Hofer Gilson & Lione

(57) ABSTRACT

The invention relates to a process for the separation and recovery of non-ferrous metals from zinc-bearing residues, in particular from residues produced by the zinc manufacturing industry. The process allows for the valorisation of metal values in a Zn-, Fe- and Pb-bearing residue, and comprises the steps of: subjecting the residue to a direct reduction step, thereby producing a metallic Fe-bearing phase and Zn- and Pb-bearing first fumes; extracting the Zn- and Pb-bearing first fumes and valorising Zn and Pb; subjecting the metallic Fe-bearing phase to an oxidising smelting step, thereby producing an Fe-bearing slag and second metals-bearing fumes; extracting the second metals-bearing fumes and valorising at least part of their metallic content. The main advantage of this process is that an environmentally acceptable output for Fe is obtained.

16 Claims, No Drawings

OTHER PUBLICATIONS

International Search Report and Written Opinion, issued in commonly owned International Application No. PCT/EP2004/009685, dated Jan. 21, 2005.

International Preliminary Report on Patentability, issued in commonly owned International Application No. PCT/EP2004/009685, dated Jan. 12, 2006.

* cited by examiner

RECOVERY OF NON-FERROUS METALS FROM ZINC RESIDUES

This application is a National Stage application of International Application Ser. No. PCT/EP2004/006238, filed Jun. 8, 2004, which claims the benefit of U.S. Provisional Application Ser. No. 60/484,648, filed Jul. 7, 2003, and which claims priority to European Patent Application No. 03077120.8, filed Jul. 4, 2003. The entire contents of these applications are hereby incorporated herein by reference in their entireties.

This invention relates to the recovery of non-ferrous metals from zinc-bearing residues, in particular from residues produced by the zinc manufacturing industry.

Blende, which is an impure ZnS ore, is the main starting material for the production of Zn. The typical industrial practice encompasses an oxidative roasting step, producing ZnO together with sulphates or oxides of the impurities. In subsequent steps, the ZnO in roasted blende is brought into solution by leaching in neutral conditions or in weak acidic conditions, thereby producing Zn-depleted residues, respectively referred to as neutral leach residue and as weak acid leach residue in this description. However, during roasting, part of the Zn reacts with Fe, a typical impurity present in blende, and forms relatively insoluble zinc ferrite. The leach residues therefore contain, besides lead sulphate, calcium sulphate and other impurities, a sizeable fraction of Zn in the form of ferrite. According to present practice, the recovery of the Zn from ferrite requires a specific hydro-metallurgical residue treatment using high acid concentrations of 50 to 200 g/l $H_2SO_4$. In U.S. Pat. No. 4,415,540 a process of this type is illustrated.

A disadvantage of this acidic treatment is that besides Zn, almost all the Fe and also other impurities such as As, Cu, Cd, Ni, Co, Tl, Sb are dissolved. As even low concentrations of these elements interfere with the subsequent electrowinning of Zn, they must be removed from the zinc sulphate solution. While Cu, Cd, Co, Ni and Tl are precipitated by addition of Zn powder, Fe is typically discarded as hematite, jarosite or goethite through hydrolysis. Due to the danger of washout of heavy metals, these Fe-bearing residues have to be disposed off in a well-controlled landfill. Land-filling of such residues has however come under heavy environmental pressure, rendering the sustainability of the process questionable. Another drawback of the above treatment is the loss of metals such as In, Ge, Ag and Zn in the Fe-bearing residue.

An alternative treatment of the ferrite bearing residues is applied in some plants, using Waelz kilns, which produce a slag and a Zn and Pb containing fume. Similarly, a rotary flame-fired furnace of the Dorschel type can be used in a batch process. In still another approach, the leach residue is processed, using coke as fuel, in a half shaft blast furnace, producing a Zn and Pb containing fume, matte and slag. These pyro-metallurgical treatments generally result in an excellent recovery of Zn and Pb, and, for some of them, in a significant recovery of Ag, Ge and In.

These processes are however inadequate for modern zinc smelters, as they cannot be scaled up to large single-vessel operations. By this fact, they are not a cost efficient solution for today's Zn smelters.

A smelting reactor process is described in 'Smelting Reactor for Recovering Zinc from Industrial Low Zinc Bearing Residues', in Erzmetall 53 (2000) Nr. 6, p. 373-384. In this process, zinc and lead are flash-volatilised by means of the carbon contained in the residues as reduction agent and as fuel. Constituents such as iron oxide, silica and alumina form a slag which is further exhausted in zinc and lead using a mixture of natural gas and oxygen blown on its surface. Iron oxide is however never reduced to the metallic state. The smelting reactor is operated at high temperatures, thereby using pure oxygen, making the economics of this process questionable.

Although numerous Zn fuming processes have been described, recent literature concentrates on the treatment of Zn-containing Fe-based secondary residues, such as EAF dusts. In this respect, the production of DRI (Direct Reduced Iron) by the direct reduction process, allows for the reduction of metals in the solid phase, thus avoiding the extreme temperatures needed to produce a melt. Processing Fe-rich residues commonly aims at the recovery of pure metallic Fe. This process is well suited for treating an Fe-rich feed such as EAF dust, but fails to produce a good quality DRI from the low-Fe, highly contaminated residues which are the subject of this invention. In such a case, the produced DRI indeed locks metals such as Cu, Ag and Ge and is therefore unsuitable for further processing by the steel industry.

One example of a process for treating Fe-rich residues is the Primus® process, as described in 'Recycling of Zinc-Bearing Residues with the Primus® Process', in Iron Steelmaker I and SM, Vol. 30, Nr 4, p. 55-60. This two-stage process combines a multiple-hearth DRI furnace with an electric furnace for converting the reduced iron in a form usable in the ferrous industry, such as cast pig iron. In the second step of this process, the DRI undergoes a final reduction, desulphurization and carburization. It is intentionally avoided to re-oxidise any iron to the slag.

The primary aim of the invention is to provide for a process for the separation and recovery of a wide range of non-ferrous metals like Cu, Ag, Ge and Zn from residues of the Zn manufacturing industry; moreover, the process must ensure an environmentally acceptable output for Fe. The actual valorisation of Fe is however unimportant due to its relatively low concentration in the contemplated residues and to its rather low intrinsic value. These aims are achieved by a process for the valorisation of metal values in a Zn-, Fe- and Pb-bearing residue, comprising the steps of:
- subjecting the residue to a direct reduction step, thereby producing a metallic Fe-bearing phase and Zn- and Pb-bearing first fumes;
- extracting the Zn- and Pb-bearing first fumes and valorising Zn and Pb;
- subjecting the metallic Fe-bearing phase to an oxidising smelting step, thereby producing an Fe-bearing slag and second metals-bearing fumes;
- extracting the second metals-bearing fumes and valorising at least part of their metallic content.

In one embodiment of the invention, in the direct reduction step, a metallic Fe-bearing phase containing at least 50%, and preferably at least 90% of the Fe contained in the Zn-, Fe- and Pb-bearing residue is obtained; in another embodiment, during the oxidising step, Fe in the metallic Fe-bearing phase is oxidised to mainly FeO in the slag, and preferably at least 50%, or even at least 90% of the Fe in the metallic Fe-bearing phase is oxidised to FeO.

The Zn-, Fe- and Pb-bearing residue may be a neutral leach residue or a weak acid leach residue. The fluidity of the slag can be enhanced by avoiding massive formation of $Fe_2O_3$, thus limiting the oxidation to the formation of mainly FeO. The presence of suitable amounts of an acidic flux such as sand and preferably, of a mixture of an acidic and a basic flux such as lime, limestone or dolomite, also enhances the slag fluidity, thus allowing for a lower working temperature.

If present, the major part of the Cu and Ag from the metallic Fe-bearing phase may be collected in a separate Cu-bearing phase during the oxidising smelting step.

If the Zn-, Fe- and Pb-bearing residue also contains Ge, the fraction of the Ge present in the first fumes, produced in the direct reduction step, may be separated and forwarded to the oxidising smelting step. This separation of Ge is preferably performed by co-precipitation with Fe hydroxide or by addition of tannic acid. The same principles apply for In.

The first fumes may advantageously be oxidised in the reactor used for the direct reduction step.

The reactor used for the direct reduction step can be a multiple hearth furnace; the reactor for the oxidising smelting step can be a submerged lance furnace.

The details of the invention are now discussed. The first step consists of the reduction of the residue, after addition of reductants such as natural gas, coal or cokes, and possibly fluxes such as limestone ($CaCO_3$) to avoid sintering of the load, thereby producing Zn- and Pb-bearing fumes. and a DRI-bearing phase containing, besides Fe, valuable metals such as Cu and Ag. Through leaching of these fumes, Zn and Pb can be separated in a Pb-containing residue and a Zn-containing leaching liquor. Ge, if present, is also dissolved in the leaching liquor, and can be precipitated as a Ge-containing residue and fed to the oxidising furnace, further enhancing the global Ge-recovery.

The DRI-bearing phase is smelted and oxidised in a second furnace, preferably after addition of limestone and sand. The oxidation of Fe to FeO, and possibly to $Fe_2O_3$, is particularly exothermic and brings in all the needed enthalpy. The process remains autogenous, even when e.g. 10% of the total feed consists of Ge-containing residues with moisture content of around 25%. However, if more than 50% of the Fe is oxidised to $Fe_2O_3$ instead of to FeO, the rise in liquidus temperature of the slag entails disadvantages such as increased lining wear and higher energy demands. The fact that Fe is slagged instead of being recovered as a metal, is a small price to pay for achieving an excellent separation and recovery of the non-ferrous metals. The slag appears to be environmentally acceptable and can even be upgraded as gravel substitute in concrete. Next to this slag, two other streams can be recovered in this operation: fumes, typically containing Ge and In, and a Cu-bearing phase containing precious metals such as Ag. This phase can be refined in a classical Cu or precious metals flowsheet, separating the Cu and Ag in a Cu-rich and a Ag-rich stream. The fumes can be leached and used as feedstock for the production of Ge.

Useful reactor types such as multiple hearth furnaces and submerged lance furnaces lend themselves to the large single-vessel operations described in this invention. The overall process is energy efficient, bears low operational costs and ensures a high metal value recovery. The invention thus provides for an essentially waste-free process that can compete economically with hydro-metallurgical Zn residue treatments.

The following example illustrates the separation of different non-ferrous metals contained in a roasted and subsequently leached blende. The analysis of the different feeds and productions are given in Table 1, together with the material balance.

10.000 g of weak acid leach residue, which mainly consists of zinc ferrite ($ZnO.Fe_2O_3$), lead sulphate ($PbSO_4$), calcium sulphate ($CaSO_4$), zinc sulphate ($ZnSO_4$) and impurities like CaO, $SiO_2$, MgO, $Al_2O_3$, $Cu_2O$, SnO, is dried and thoroughly mixed with 3.000 g cokes, having a purity of >85% C. The amount of cokes is calculated in order to reduce Fe and the other metals in the DRI, and fume Zn and the other metals in the fumes, with an excess of around 5% to handle fluctuations in the feed composition. The metal content of the leach residue is given in Table 1, where "Others" refers to the impurities summed up above and to the bound oxygen and sulphur. For the cokes, "Others" refers to its ash content. No flux was added in this experiment.

The mixture is then loaded in a direct reduction furnace with an internal diameter of 454 mm and a height of 470 mm. Two arms are perpendicularly attached to a central shaft. The shaft is rotating at 2 rpm. Four teeth are located on each arm, which continuously stir the load. The teeth are positioned in such a way that one arm pushes the load towards the central shaft, while the other arm pushes in the opposite direction, resulting in a continuous stirring of the load without piling up at the furnace periphery. The atmosphere in the furnace is controlled by using a separate combustion chamber, where a mixture of air and natural gas is combusted. The nominal gas flow is 6 $Nm^3$/hr natural gas and 47 $Nm^3$/hr air, leading to a lambda value of 1. During 2 hours, the mixture is gradually heated until the temperature of the furnace atmosphere reaches 1100° C.; this temperature is maintained for approximately 4 hours. Fumes are collected using a cartridge filter, which is emptied every hour. The analysis of the fumes shown in Table 1 is the mean analysis of the hourly collected samples. These fumes are rich in Zn and Pb, present as ZnO and $PbO/PbSO_4$. "Others" in Table 1 mainly consists of oxygen and sulphur bound to the fumed metals, together with some carry-over.

At the end of the reduction step, the DRI is removed from the furnace and sampled for analysis. The DRI obtained contains 88% of the Ag, 99% of the Cu, 70% of the Ge, 7% of the Zn and 98% of the Fe when related to the feed. The low amount of Fe in the DRI (41.9%) is caused by the dilution with cokes remnants and light-metal oxides such as CaO, $SiO_2$, $Al_2O_3$ and MgO from the residue. This differentiates the obtained DRI from classic DRI's, which typically contain 80 to 90% Fe.

In a second step, sand and limestone are added to the DRI and the resulting mixture is loaded in an oxidising furnace. It is melted under $N_2$-atmosphere in a crucible and maintained at 1200° C. for about 3 hours, while air is bubbled through the molten bath, resulting in the burning of the remaining C from the cokes and in the oxidation of Fe to FeO. The amount of air needed for oxidation of the Fe to FeO is calculated based on the analysis of the DRI given in Table 1. Production of $Fe_2O_3$ is avoided to obtain a slag with as low a liquidus temperature as possible. The burning of cokes and the conversion of Fe to FeO generate enough energy to operate the furnace without any $O_2$ enrichment.

After the oxidative smelting step, three separate phases were recovered: fumes, slag and a Cu-bearing phase. The fumes are collected in a cartridge filter. Table 1 shows that these fumes are again rich in Zn and Pb. Thanks to the low total amount of fumes, elements like Ge and In, but also impurities like As, Sn, Bi and Sb, undergo a substantial concentration when related to the feed.

The environmental stability of the slag was tested on the slag as such and after formation of concrete containing 30% slag and 10% cement. The tests were performed according to European norm NEN 7343, whereby the material is broken to a PSD of less than 4 mm and percolated with acidified water. The leachability was assessed according to the VLAREA ("Vlaams reglement voor afvalvoorkoming") norm for non-ferro metallurgical slags. The leachability of both the slag and the slag-containing concrete proved to be well below the limits applicable to products intended for the building industry.

The Cu-bearing phase and the slag are separated by decantation, sampled and analysed. The slag analysis shows minimal amounts of leachable heavy metals, such as Pb, ensuring that an environmentally clean slag is obtained. The high percentage of "Others" in the slag is attributable to CaO, $SiO_2$, MgO and $Al_2O_3$.

The Cu-alloy contains 89% of the Ag and 80% of the Cu in the feed, together with some impurities, mainly Fe, As, Sb, Sn.

TABLE 1

Material balance and metal recovery per produced phase

| Component | Mass (g) | Composition (wt. %) | | | | | | | | |
|---|---|---|---|---|---|---|---|---|---|---|
| | | Ag | Pb | Cu | Zn | Fe | S | Ge | C | Others |
| Feed to reduction step | | | | | | | | | | |
| Residue | 10000 | 0.04 | 4.7 | 2.2 | 27.0 | 23.0 | 4.4 | 0.008 | | 38.7 |
| Cokes | 3000 | | | | | 0.2 | 0.4 | | 89 | 10.4 |
| Products of reduction step | | | | | | | | | | |
| Impure DRI | 5440 | 0.07 | 0.64 | 4.0 | 3.8 | 41.9 | 2.9 | 0.011 | 10 | 36.7 |
| First fumes | 4670 | 0.01 | 9.3 | 0.04 | 53.4 | 0.60 | 6.3 | 0.005 | | 30.3 |
| Feed to oxidising smelting step | | | | | | | | | | |
| Impure DRI | 5440 | 0.07 | 0.64 | 4.0 | 3.8 | 41.9 | 2.9 | 0.011 | 10 | 36.7 |
| Sand | 1220 | | | | | | | | | 100 |
| Limestone | 800 | | | | | | | | | 100 |
| Products of oxidising smelting step | | | | | | | | | | |
| Fe-slag | 6780 | <0.01 | 0.10 | 0.6 | 2.2 | 33.4 | 1.5 | <0.001 | <0.05 | 62.2 |
| Cu-alloy | 207 | 1.8 | <0.1 | 85 | <0.1 | 5.0 | 2.0 | <0.001 | <0.05 | 6.23 |
| Second fumes | 186 | <0.01 | 15.2 | 1.0 | 32.4 | 1.0 | 2.35 | 0.32 | | 47.7 |

| | Recovery (%) | | | | | | |
|---|---|---|---|---|---|---|---|
| Component | Fraction (wt. %) | Ag | Pb | Cu | Zn | Fe | S | Ge |
| Fe-slag | 52 | | 1 | 18 | 5 | 98 | 23 | |
| Cu-alloy | 2 | 89 | | 80 | | | 1 | |
| First fumes | 36 | 11 | 93 | 1 | 92 | 1 | 65 | 30 |
| Second fumes | 1 | | 6 | 1 | 2 | | 11 | 70 |

The invented process thus achieves the separation of the metals as follows:

Zn, Pb and a minor part of the Ge in first fumes which can be treated by known means for separation of Pb and Ge in different residues, and of Zn in a leach liquor;

Cu and Ag in an alloy which can be refined using a classical Cu and precious metals flowsheet;

Ge in second fumes that are greatly Ge-enriched and from which Ge can be refined cost-effectively;

Fe in an inert and environmentally clean slag, reusable as e.g. gravel substitute in concrete.

The invention claimed is:

1. A process for the valorisation of metal values in a Zn-, Fe- and Pb- bearing residue, comprising the steps of: subjecting the residue to a direct reduction step in a first reactor, thereby producing a metallic Fe-bearing phase and Zn- and Pb-bearing first fumes; extracting the Zn- and Pb-bearing first fumes and valorising Zn and Pb; subjecting the metallic Fe-bearing phase to an oxidising smelting step in a second reactor, thereby producing an Fe-bearing slag and second metals-bearing fumes; extracting the second metals-bearing fumes.

2. The process according to claim 1, wherein the direct reduction step of the Zn-, Fe- and Pb-bearing residue provides a metallic Fe-bearing phase comprising at least 50% of the Fe contained in the Zn-, Fe- and Pb-bearing residue.

3. The process according to claim 1, wherein the direct reduction step of the Zn-, Fe- and Pb-bearing residue provides a metallic Fe-bearing phase comprising at least 90% of the Fe contained in the Zn-, Fe- and Pb-bearing residue.

4. The process according to claim 1, wherein during the oxidising smelting step, Fe in the metallic Fe-bearing phase is oxidised to mainly FeO in the slag.

5. The process according to claim 4, wherein in the oxidising smelting step at least 50% of the Fe in the metallic Fe-bearing phase is oxidised to FeO.

6. The process according to claim 4, wherein in the oxidising smelting step at least 90% of the Fe in the metallic Fe-bearing phase is oxidised to FeO.

7. The process according to claim 1, wherein the Zn-, Fe- and Pb-bearing residue is a neutral leach residue or is a weak acid leach residue.

8. The process according to claim 4, wherein an acidic flux is present in the oxidising smelting step.

9. The process according to claim 4, wherein a mixture of an acidic and a basic flux are present in the oxidising smelting step.

10. The process according to claim 1, wherein the Zn-, Fe- and Pb-bearing residue contains Cu and Ag, and, during the oxidising smelting step, a separate Cu-alloy phase is produced containing a major part of the Cu and Ag.

11. The process according to claim 1, wherein the Zn-, Fe- and Pb-bearing residue contains a Ge fraction, further comprising, after the direct reduction step, separating and forwarding Ge fraction in the first fumes to the oxidising smelting step.

12. The process according to claim 11, wherein the separation of Ge is performed by co-precipitation with Fe hydroxide or by addition of tannic acid.

13. The process according to claim 1, wherein the Zn-, Fe- and Pb-bearing residue contains Ge, and, after extracting the second metals-bearing fumes, at least part of the second metals-bearing fumes metallic content is valorised.

14. The process according to claim 1, wherein the first fumes are oxidised in the first reactor, which is used for the direct reduction step.

15. The process according to claim 1, wherein the first reactor which is used for the direct reduction step, is a multiple hearth furnace.

16. The process according to claim 1, wherein the second reactor, which is used for the oxidising smelting step, is a submerged lance furnace.

* * * * *

UNITED STATES PATENT AND TRADEMARK OFFICE
CERTIFICATE OF CORRECTION

PATENT NO. : 7,597,740 B2  Page 1 of 1
APPLICATION NO. : 10/562347
DATED : October 6, 2009
INVENTOR(S) : Maurits Van Camp, Jonathan Aerts and Benedict Janssens It is certified that error appears in the above-identified patent and that said Letters Patent is hereby corrected as shown below:

IN THE CLAIMS:

Column 6, claim 11, line 63-64, after "separating and forwarding" insert --a--.

Column 8, claim 15, line 2, after "reactor" insert --,--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,597,740 B2
APPLICATION NO. : 10/562347
DATED : October 6, 2009
INVENTOR(S) : Van Camp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this

Fourteenth Day of December, 2010

David J. Kappos
*Director of the United States Patent and Trademark Office*